(12) United States Patent
DeCenzo et al.

(10) Patent No.: US 9,432,732 B2
(45) Date of Patent: *Aug. 30, 2016

(54) IMPRINT CLIENT STATISTICAL FILTERING

(71) Applicant: TVWorks, LLC, Philadelphia, PA (US)

(72) Inventors: Christopher John DeCenzo, San Francisco, CA (US); James Hindle, Ontario (CA)

(73) Assignee: TVWorks, LLC, Philadelphia, PA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/056,456

(22) Filed: Oct. 17, 2013

(65) Prior Publication Data

US 2014/0101687 A1   Apr. 10, 2014

Related U.S. Application Data

(63) Continuation of application No. 13/047,075, filed on Mar. 14, 2011, now Pat. No. 8,589,985, which is a continuation of application No. 12/252,432, filed on Oct. 16, 2008, now Pat. No. 7,921,207, which is a continuation of application No. 10/834,753, filed on Apr. 29, 2004, now Pat. No. 7,440,999.

(51) Int. Cl.

| | |
|---|---|
| *H04N 7/173* | (2011.01) |
| *H04N 5/445* | (2011.01) |
| *H04N 21/442* | (2011.01) |
| *H04N 7/16* | (2011.01) |
| *H04N 21/2547* | (2011.01) |
| *H04N 21/472* | (2011.01) |
| *H04N 21/658* | (2011.01) |
| *H04N 21/6587* | (2011.01) |
| *H04N 21/81* | (2011.01) |

(52) U.S. Cl.
CPC ........ *H04N 21/44245* (2013.01); *H04N 7/165* (2013.01); *H04N 21/2547* (2013.01); *H04N 21/47202* (2013.01); *H04N 21/6582* (2013.01); *H04N 21/6587* (2013.01); *H04N 21/8173* (2013.01)

(58) Field of Classification Search
CPC .............................. H04N 5/445; H04N 7/173
USPC .................................. 725/10, 61, 28, 46, 87
See application file for complete search history.

(56) References Cited

U.S. PATENT DOCUMENTS

| | | |
|---|---|---|
| 5,857,190 A | 1/1999 | Brown |
| 6,289,514 B1 | 9/2001 | Link et al. |
| 6,298,482 B1 | 10/2001 | Seidman et al. |

(Continued)

FOREIGN PATENT DOCUMENTS

CA         2503208         4/2005

OTHER PUBLICATIONS

Response to Canadian Office Action; CA 2,503,208; Mailing date: Apr. 7, 2015.

(Continued)

*Primary Examiner* — Kieu Oanh T Bui
(74) *Attorney, Agent, or Firm* — Banner & Witcoff, Ltd.

(57) ABSTRACT

A method, system API and computer product for adapting reverse data channel (RDC) utilization by selectively restricting the reporting of statistics data from client devices using a client-side filter adapted in response to configuration data from a file or other source file.

20 Claims, 5 Drawing Sheets

(56) References Cited

U.S. PATENT DOCUMENTS

| | | |
|---|---|---|
| 6,351,467 B1 | 2/2002 | Dillon |
| 6,823,190 B2 | 11/2004 | Ford et al. |
| 6,986,154 B1 | 1/2006 | Price et al. |
| 7,003,792 B1 | 2/2006 | Yuen |
| 7,552,460 B2 | 6/2009 | Goldman |
| 2002/0112239 A1 | 8/2002 | Goldman |
| 2002/0116265 A1 | 8/2002 | Hernandez |
| 2004/0031052 A1 | 2/2004 | Wannamaker et al. |
| 2004/0117816 A1 | 6/2004 | Karaoguz et al. |

OTHER PUBLICATIONS

Dittrich, et al., "Data Redundancy and Duplicate Detection in Spatial Join Processing", Proceedings of the 16th International Conference on Data Engineering, Mar. 3, 2000.

CIPO Office Action in Canadian Application No. 2,503,208, dated Aug. 10, 2012.

CIPO Office Action in Canadian Application No. 2,503,208, dated Jul. 12, 2011.

IMPRINT CLIENT STATISTICAL FILTERING

CROSS-REFERENCE TO RELATED APPLICATIONS

This application is a continuation application of and claims priority to U.S. application Ser. No. 13/047,075, filed Mar. 14, 2011, which claim priority to Ser. No. 12/252,432, filed Oct. 16, 2008 (now U.S. Pat. No. 7,921,207), having the same title, which is a continuation of U.S. application Ser. No. 10/834,753, filed Apr. 29, 2004 (now U.S. Pat. No. 7,440,999); all prior applications are incorporated herein by reference in their entireties.

BACKGROUND OF THE INVENTION

1. Field of the Invention

The present invention relates to data processing systems and, more particularly, the management of statistical data pertaining to a client device.

2. Description of the Related Art

In information distribution systems such as cable television systems and the like, a very large number of client devices such as set top boxes (STBs) are supported by one or more servers or head ends. Video information, audio information and/or other data is propagated from the server(s) to the clients via a high bandwidth forward application transport channel (FATC) within a distribution network. Control data may also be propagated via a forward data channel (FDC) within the distribution network. Control and other data may be propagated from the client to the server via a relatively low bandwidth reverse data channel (RDC).

It is desirable to capture client usage, demographic and other statistics for various purposes, such as improving the user experience, providing increased content relevant to the user community, providing marketing and sales information, billing purposes and the like. Unfortunately, due to the number of clients and limited bandwidth of the RDC in a typical information distribution system, it is not practical to capture all statistics from all clients and propagate that information back to the server.

SUMMARY OF INVENTION

The invention comprises a method, system, API and computer product for adapting reverse data channel (RDC) utilization by selectively restricting the reporting of statistics data from client devices using a client-side filter adapted in response to a configuration file. Also disclosed are related techniques for organizing and configuring the collection of a wide assortment of different statistics from a set of client devices running comparable software in an environment where communication with those clients is severely limited (e.g., reverse data channel bandwidth and/or memory constraints).

Specifically, and as will be discussed in more detail below, individual applications or middleware running on client devices propagate respective sub-sets of statistical information available from the client device. The sub-set of the statistical information propagated to the service is defined by a filter associated with the application. The filter criteria is discussed as being defined by a configuration file which may be a default file resident on the client or a file transmitted to the client from the server. Different clients may be provided with different filter criteria.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be described within the context of a client device; namely, a set top box (STB) operating within a digital cable television network. However, it will be appreciated by those skilled in the art and informed by the teachings of the present invention that the invention may be practiced within any information distribution system, such as a satellite television distribution system and the like. Generally speaking, while the invention is suitable for use in many types of information distribution systems, the invention finds its greatest applicability within the context of a system having a constrained bandwidth reverse data channel. Moreover, the invention has applicability within the context of individual client devices and groups of client devices.

Figure 1:
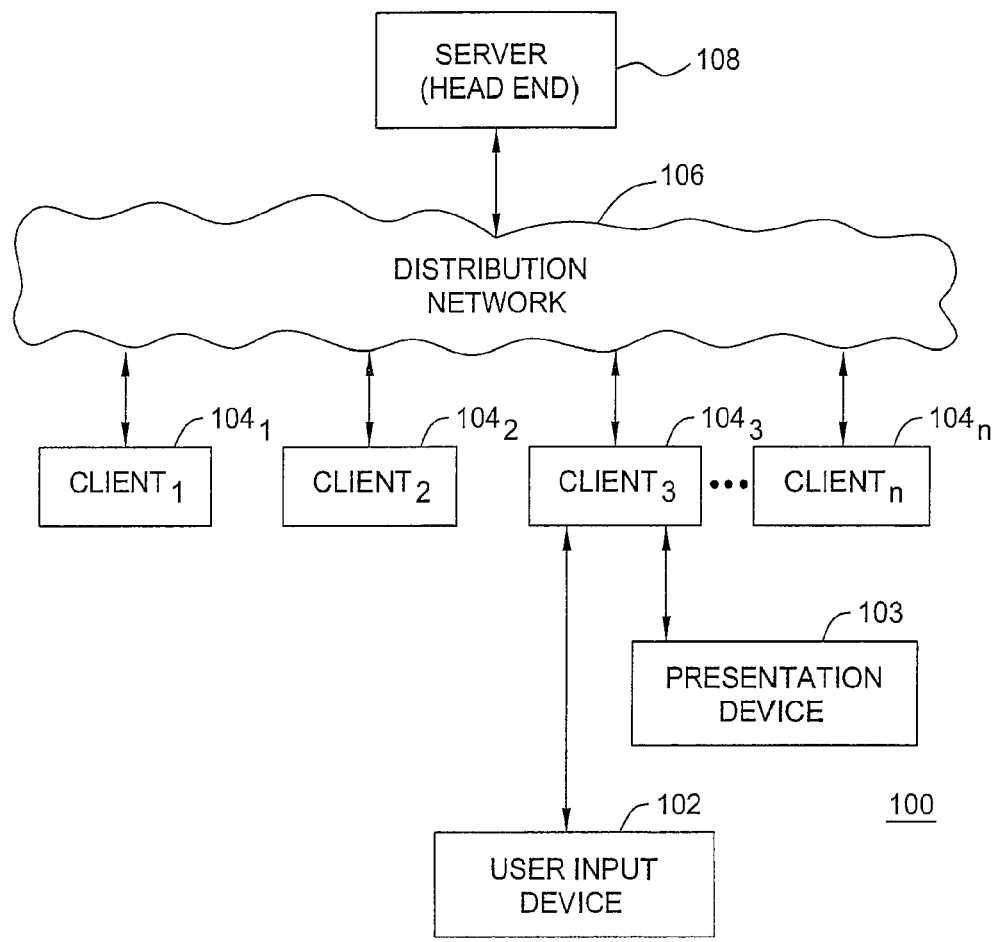
FIG. 1 depicts a high level block diagram of an information distribution system suitable for use with the present invention.

FIG. 1 depicts a high level block diagram of an information distribution system suitable for use with the present invention. A server 108 such as a digital cable television system head end communicates with a plurality of client devices 1041 through 104N (collectively client devices 104) via a distribution network 106. While only depicted for client device 1043, each client device 104 has associated with it a presentation device 103 (e.g., a television or other display device) and a user input device 102 (e.g., a remote control STT or display keypad, or other user input device). The client device 104 receives information via a forward application transport Channel (FATC) supported by the distribution network 106. The received information, such as audiovisual programming or other content, control and/or session commands and the like is processed by the client device 104. In response to the user input device 102, the client device selectively tunes, demultiplexes and otherwise processes received information streams to produce a presentation signal suitable for display via the presentation device 103.

In one embodiment, distribution network 106 comprises a hybrid fiber coax network or satellite television network. In one embodiment of the invention, the client devices comprise set top boxes such as the model DCT2000 manufactured by Motorola Corporation of Schaumburg, Ill.

The server 108 includes data input, processing, storage, data serving and other equipment suitable for use within the context of a server as described herein. Specifically, and as will be discussed in more detail below, individual applications or middleware running on client devices propagate respective sub-sets of statistical information available from the client device. The sub-set of the statistical information propagated to the server is defined by a filter associated with the application. The filter criteria is discussed as being defined by a configuration file which may be a default file resident on the client or a file transmitted to the client from the server. It should be noted that the use of a configuration file for defining the filter is just one possible method for configuring statistics filters. In alternate embodiments, the server determines the correct filter for a specific set top box interactively. For example, in such an embodiment a server maintains a data base of mappings from a set top box (or associated household) to available statistical filters. The statistical filters may be associated with individual households, neighborhoods or regions. In either case, the identity of the set top box/household is known to the server and the server responsively provides the appropriate statistical filters to the set top box. Thus, the use of a configuration file is one technique for providing configuration parameters.

In the case of the configuration file being transmitted from the server, the. server includes mechanisms to allow server-side personnel or other entities to generate and transmit the configuration file. One such entity may comprise the cable television distributor or MSO. Another such entity may comprise the owner of a particular application, such as a game application, VOD application, EPG application, and the like. Each of the application owners operates to control its respective application and, preferably, increase the value of its respective application to the user community.

The statistical information returned by the deployed applications enables the application provider to improve the value of the application to the user community. To avoid over utilization of the RDC, the filtering techniques discussed herein are employed to reduce the amount of data, statistical and other data, provided by the deployed applications back to the server. In one embodiment, the configuration files are defined by the specific application owners. In another embodiment, the MSO further defines a priority between various applications, which priority may depend upon the revenue generating potential of the application, the importance of a particular statistical item (e.g., a VOD purchase command and the like) or other data.

Thus, given a plurality of applications deployed across a large community of client devices, in one embodiment of the invention each of the applications has associated with it a priority level. Those applications having a higher priority level will be able to preferentially transmit their respective statistical data back to the server.

Figure 2:
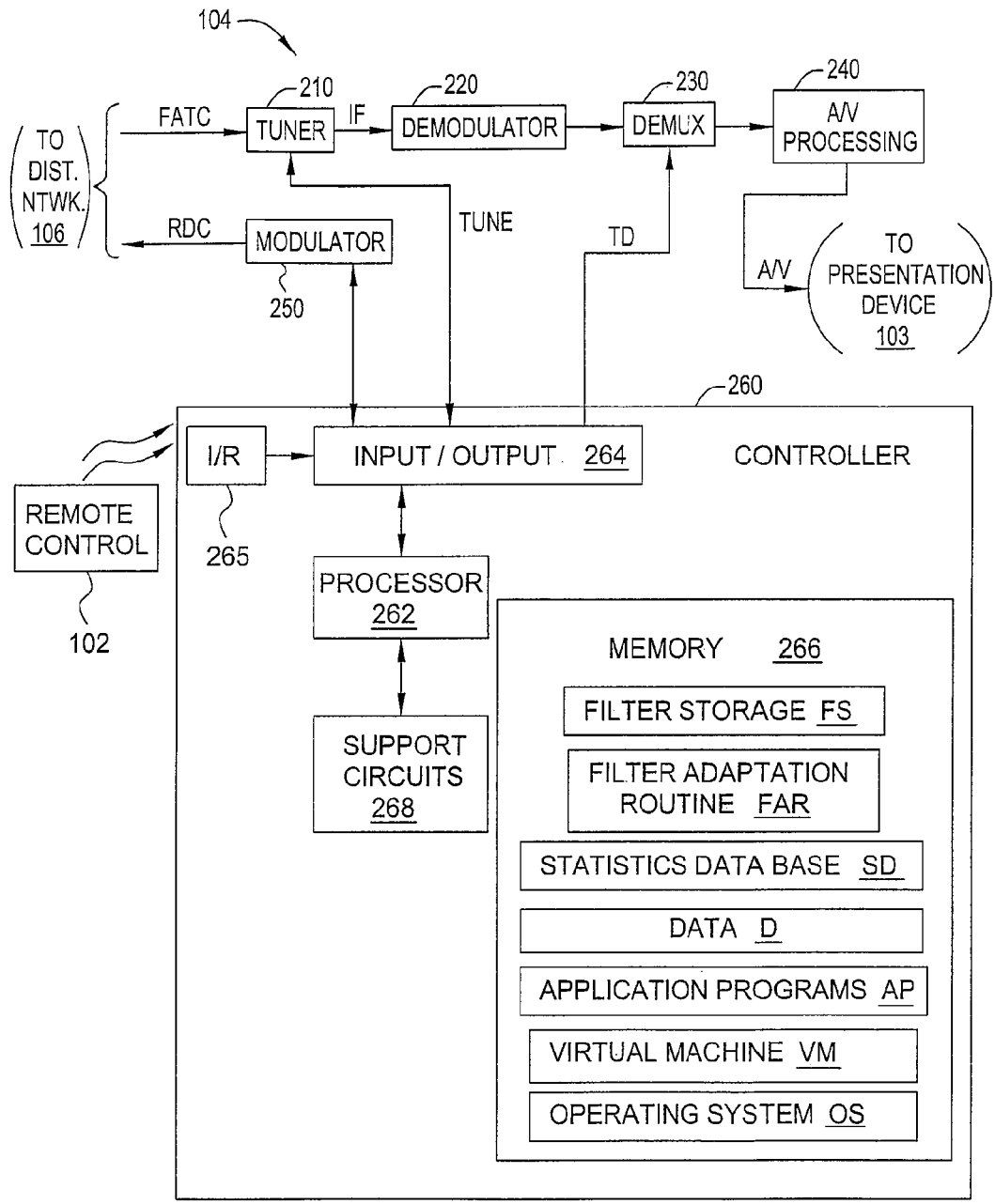
FIG. 2 depicts a high level block diagram of a controller topology suitable for use in the information distribution system of FIG. 1.

FIG. 2 depicts a high level block diagram of a client device 104 suitable for use in the system 100 of FIG. 1. Specifically, the client 104 comprises a tuner 210, demodulator 220, demultiplexer 230, audio/video processing module 240, modulator 250 and controller 260. User interaction is provided via a user input device.

Tuner 210 receives, e.g., a radio frequency (RF) signal comprising, for example, a plurality of quadrature amplitude modulated (QAM) information signals from a downstream (forward) channel. Tuner 210, in response to a control signal TUNE, tunes a particular one of the QAM information signals to produce an intermediate frequency (IF) information signal. Demodulator 220 receives and demodulates the IF information signal to produce an information stream, illustratively an MPEG transport stream. The MPEG transport stream is coupled to a transport stream demultiplexer 230. The transport stream demultiplexer 230, in response to a control signal TD produced by controller 260, demultiplexes (i.e., extracts) audio, video and/or other information streams which are then coupled to the audio/video processing module 240. The AV processing module 240 processes the audio/video information streams to produce audio and video signals suitable for use by presentation device 103.

Controller 260 comprises a microprocessor 262, an input/output module 264, a memory 266, an infrared (IR) receiver 265, and support circuitry 268. The processor 262 cooperates with conventional support circuitry 268 such as power supplies, clock circuits, cache memory and the like, as well as circuits that assist in executing the software routines that are stored in memory 266. The input/output circuitry 264 forms an interface between the controller 260 and the tuner 210, transport demultiplexer 230, back channel modulator 250 and remote control device 102. Controller 260 optionally propagates command and/or control information to the server 108 by modulating the command and/or control information using the modulator 250 and propagating the modulated information to the head end via the reverse data channel RDC supported by the distribution network 106. Such information may comprise, for example, application-related statistics processed according to the various embodiments of the invention as described herein.

The user input device 102 comprises a joy stick, a keypad and/or other user input or remote control functionality. The functionality of user input device 102 may also be performed via controls positioned on the client device 104 directly. User manipulations of the joy stick, keys and the like or the remote control device are transmitted to the controller 260 via the infrared link 265. The controller 260 is responsive to such user manipulations and executes appropriate user interaction routines. As noted below, user manipulations and the like are captured at a statistical level and, optionally, stored for further processing.

The memory 266 of controller 260 supports a filter storage FS, a filter adaptation routine FAR, a statistics data base SD, other data D, application programs AP, virtual machine VM and an operating system OS. Within the context of the present invention, each of a plurality of application programs AP may have associated with it a desired set of statistics to be captured. The application programs AP comprise, illustratively, Java applets interpreted by a Java virtual machine VM. The virtual machine VM may comprise a standard Java VM or a modified VM, such as the Liberate TV Navigator manufactured by Liberate Technologies of San Mateo, Calif. The virtual machine VM and operating system OS support a variety of applications and functions, such as an interactive program guide (IPG), a video-on-demand (VOD) module, a game module or other applications. The statistics data base SD may comprise, illustratively, a buffer that accumulates statistic records that pass through the respective filter(s). The contents of the buffer are then sent via, for example, the RDC to the server when the buffer is full (or at a threshold utilization level such as 80%), at predetermined or periodic times (e.g., every 12 or 24 hours), at predetermined durations since a last buffer transmit, on demand from the server on some other schedule or a combination of these times/levels.

In general, the controller 260 operates to capture or log various user statistics, which statistics are stored in a statistics data base SD. Such statistics include keys pressed by a user, channels viewed by a user, time of viewing, content of viewed channels, duration of key press, demographic information and the like. Each statistic has a 'key' associated with it that is used for reporting purposes. These statistic keys are also used to filter statistics to limit the upstream bandwidth usage.

An exemplary set of statistics is provided below. These statistics are useful for third party application developers, distribution system owners (e.g., MSOs or satellite TV providers) and the like.

TVLC—Changed channel, includes duration tuned to previous channel and previous channel number. Only logged if on that channel for >n seconds, where n is defined by the application logging the statistic. Normally logged only by Liberate's menu service (or 'NavShell').

APLN—Loads an application into memory and starts it. Includes name of application and a timestamp. Normally logged only by Liberate's menu service.

APDN—Unloads an application from memory. Includes the name of the application and a timestamp. Normally logged only by Liberate's menu service.

NAVS—User navigated to a particular screen within an application. Includes an identifier for the screen, the name of the application and a timestamp.

HELP—User requested help. Includes the name of an application.

PPV—User requested information about a pay-per-view offering, normally logged by an IPG application.

VOD—User requested information about video on demand offerings. Normally logged by either a VOD module or the IPG if the two are integrated.

UNON—User powered on the client device. Includes a timestamp. Normally logged by Liberate's middleware.

UNOFF—User powered off the client device. Includes a timestamp. Normally logged by Liberate's middleware.

TVMU—User mutes TV audio.

TVUM—User un-mutes TV audio

ULIN/ULOF—If we supported multiple user profiles for a. single client device we could use these stats to indicate a specific user logging in or out of our interactive service.

UWWW—For access to internet or 'walled garden' content, this stat is logged to indicate the URL of a page requested by a user.

BGDN—An indication of interactive content available for the currently tuned program is sometimes presented with a graphical 'bug' being drawn to the screen. This statistic record is logged when that bug is drawn to the screen. It includes the 'target' for the interactive content when selected and the currently tuned channel and timestamp. It would be logged by the application responsible for displaying the bug (IPG, menu service, third party ETV application, etc.)

BGSL—See BGDN. This is the user selecting the bug to launch the associated content. Logged by the same application that logs BGDN this would include the timestamp NVBT—The user 'selected' a navigable button within an application. The record would include an identifier for the application and button and a timestamp.

TKCV—The user viewed a category of stories available in a 'ticker' or 'crawl' application. The stat would be logged by the ticker application, and would include an identifier for the category.

TVST—The user viewed a particular story in a 'ticker' or 'crawl' application. The stat would be logged by the ticker application and would include an identifier for the story.

ERR—Logs an error condition.

META—A third party may log all their statistics with a key that identifies their company. For example this key could be used by 'MetaTV'.

GMHS—A generic game high score stat. Could be used for a community based high score server.

STAT—The statistic log itself. These records are always logged (only by the middleware) and include information) indicating what the current statistic filter list is. It is logged with a timestamp and is logged each time the data in filter storage FS changes.

The statistics filtering criteria for each application are stored in the filter storage FS. The stored filters for the applications are adapted according to the filter adaptation routine FAR. In operation, the client 104 operates to log, capture or otherwise retrieve statistical information, while the applications APs desiring to report such statistical information are able to use only that portion of the statistical information meeting their respective filtering criteria. In this manner, those applications reporting statistical information back to the server are constrained in the amount of reverse data channel (RDC) bandwidth they are allowed to use. In one embodiment of the invention, the client retrieves statistical information pertaining to a large number of parameters, but stores only the statistical information meeting the filtering criteria of the stored filters for the applications. In an alternate embodiment, the client operates to capture only the statistical information meeting the statistics filtering criteria. For example, a middleware provided application programming interface (API) logs statistics which are then either discarded or passed between applications depending upon whether the statistical filtering criteria associated with the application is met. If the filtering criteria are met, the statistics are passed to the statistics data base (e.g., buffer) for subsequent transmission to the server via the RDC.

Thus, given a finite amount of bandwidth for the reverse data channels within the system 100 of FIG. 1, the amount of RDC bandwidths consumed by the various clients is controlled by controlling the amount of statistical information propagated back to the server from the various applications.

The control mechanism according to various embodiments of the invention comprises a filtering criteria applied to each application in each client, as well as more generalized filter that may be applied on a client-to-client basis. The filtering criteria may be dynamically adjusted by the server to enable more or less statistical information to be sent by particular clients, client groups (i.e., neighborhoods) and the like. In this manner, the server, MSO or other controlling entity operates to control the RDC bandwidth consumed by the clients by adapting the filtering criteria used by the client applications to send statistical data back.

In one embodiment of the invention, the statistical data sent back is prioritized such that critical statistical data is preferentially propagated back to the server. Such preferential treatment is given, for example, to billing-related statistical data (e.g., purchases of content, view on/view off data where viewing is a metered and billed event, and the like), to specific applications (e.g., VOD, games), or to specific client groups (e.g., a target demographic user group or location).

The invention contemplates reporting filtered statistics from the collecting entity (e.g., the application programming interface (API) or middleware environment) to the applications themselves (for subsequent reporting or propagation to, e.g., a server or application owner) or directly to a server. Memory operating as a buffer is used to effect the reporting of statistics. Space allocations within the buffer memory are allocated in a first in first out (FIFO) manner or via a priority allocation technique.

In one embodiment of the invention, duplicate statistical data is redacted from the buffer memory prior to transmitting the buffer memory contents to a server via the reverse data channel or other back channel. That is, where multiple applications request the same statistical information, statistical information that may be shared or is common to the multiple applications is aggregated for the benefit of multiple applications.

In another embodiment, the reported statistical data is further processed to provide derivative statistical data (e.g., total time viewing related programming, content or other contextual information pertaining to user selections and the like). The derivative statistical data may be provided along with or in place of the relevant initial statistical data. Such further processing of the statistical data may be performed on a client device or on a server.

Figure 3:
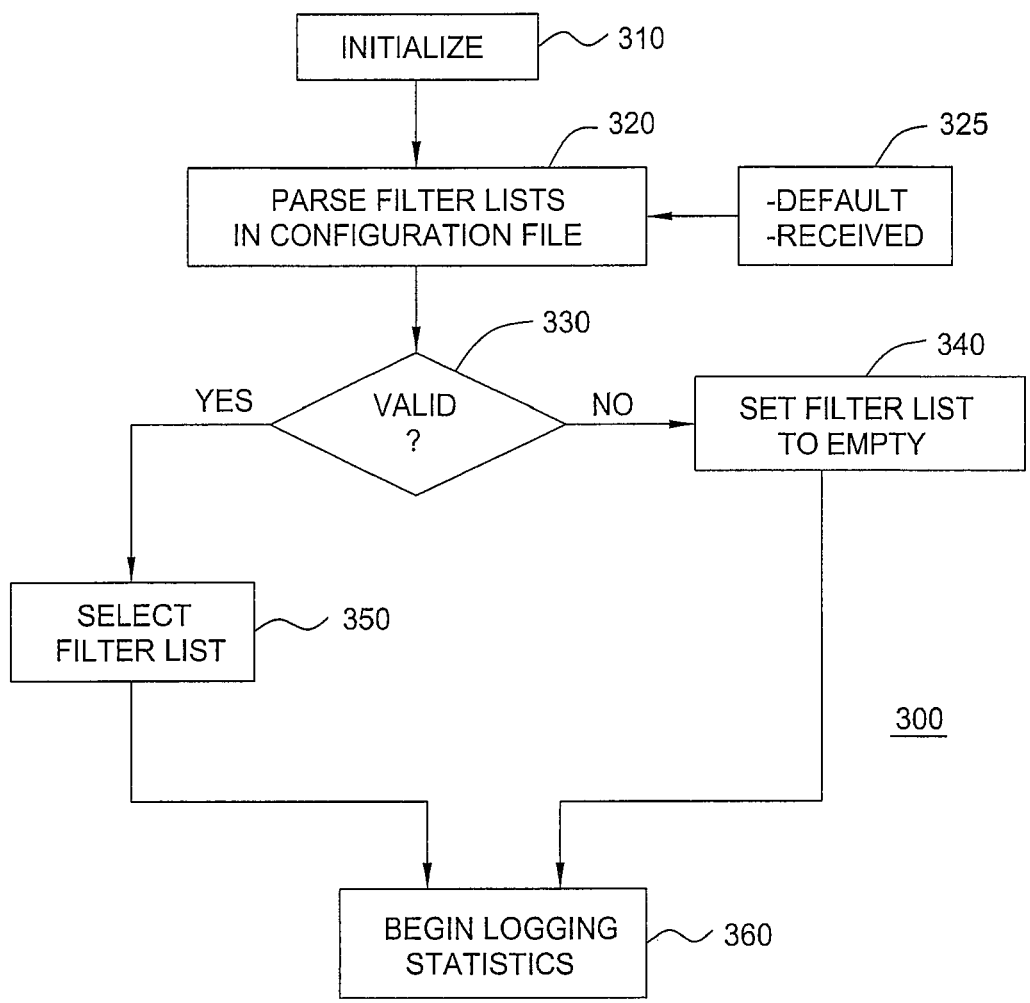
FIG. 3 depicts a flow diagram of a method according to an embodiment of the invention.

FIG. 3 depicts a flow diagram of a method according to an embodiment of the invention. Specifically, the method 300 of FIG. 3 comprises a filter initialization routine suitable for use within the context of the present invention. The initialization routine is entered at step 310, when a client device is initialized (e.g., power on, warm reset and the like). At step 320, filter lists within a configuration file (or other means providing configuration parameters) are parsed. That is, referring to box 325, a default configuration file, a configuration file is received from, for example, the server or an alternate configuration parameter bearing data structure is parsed to identify filtering criteria. At step 330, a determination is made as to whether the parsed configuration file is valid. If the configuration file is invalid (or not present), then the filter list associated with an application is set to an empty condition. In an empty condition, no statistics are propagated to the server via the application. Alternatively, in various embodiments of the invention all statistics or a default set (subset) of statistics known to, illustratively, the middleware is propagated to the server.

If the configuration file is valid, then at step 350 the filter list associated with the application is selected. At step 360, the client begins logging statistics associated with user interactions and the like. Those statistics corresponding to the filter criteria are propagated from the application to the server via the reverse data channel.

The method 300 of FIG. 3 depicts the establishment of filter criteria for a particular application based upon configuration files either resident at the client (i.e., a default configuration file) or transmitted to the client from a server. The configuration files may also be included within an applet that is transmitted to the client, wherein the applet may further include an actual application to be executed by the client. In one embodiment of the invention, applications having a priority level above a threshold level are able to request a change to the current filter list. Such applications may comprise, for example, MSO control applications, VOD billing applications and the like. That is, each of at least one application running on the STB has associated with it a respective priority level. Those applications having a priority level above a threshold level are enabled to request changes to their respective filter parameters. The parameter change requests may be propagated to the server via the RDC for a server decision, or may be decided by the STB.

Thus, in general, one embodiment of the invention operates by enabling software and applications to collect data with the finest level of granularity, and to pass all statistics collected through a configuration-driven filter so that only a small number of the statistics actually get sent to the statistics collection server.

Client Community/System Management Functions

Within the context of, for example, a digital cable television distribution system, it is desirable to extract statistical information pertaining to the user or client community. The client or user community may comprise some or all of the client devices (e.g., STBs) within a single information distribution system or group of information distribution systems. However, given the bandwidth constrained nature of the RDC within the system(s), it has been determined by the inventors that a sampling of statistical data associated with less than all of the user community is at times appropriate. Thus, the invention has applicability within the context of statistics appropriate to an individual set top box as well as statistics appropriate to a neighborhood or system(s).

To determine sampled behaviors of the client or user community, a method for identifying which clients within the client base will provide statistics, and which statistics will be provided, is employed within one embodiment of the invention. Thus, in general, configuration of a statistics filter is driven by a list of the different types of statistics that a given set top box should collect, where each statistic type is represented by an abbreviated name or identification. The abbreviated names or identifications are discussed above. In various embodiments, priority reporting of statistics may also be employed to further conserve RDC bandwidth.

In one embodiment of the invention, each client or set top box within an information distribution system is given a respective filter configuration. In another embodiment of the invention, the clients within the information distribution system are divided into groups, where each member of a particular group is given a common statistics filter criteria. Client or set top box group membership is determined according to any of geographic region, head end node, household information, random selection and the like.

In one embodiment of the invention, an application programming interface (API) (denoted as logStatisic( )) is provided such that an application invoking this function initiates the logging of a particular statistic upon application launch. In this embodiment, when an application determines that conditions for a statistical event have been met, the application calls the logStatistic( ) function with a key value and any extra data associated with the statistic. The logStatistic( ) API implementation then checks if the key value passed into it passes the current filter before storing it in the SD for later transmission to the server. During application execution, if a call is made with a key value that is included within the filter list, then the logged statistic associated with that key value is valid and added to an output buffer associated with the application. This occurs for each of the statistics deemed to be valid with respect to the application according to the filter list associated with the application. The contents of the output buffer are periodically transmitted to the server via the reverse data channel. Where the application calls with key value that is not within the filter list, it is presumed to be invalid and even though that statistic may be logged by the client device, the statistic is not included within the output buffer associated with the calling application and, therefore, is not propagated by that application to the server. Thus, applications may be invoked in which the application requests every available statistic from the client device. In this case, the filter is used to define which sub-set of the logged statistics will be available to the application for subsequent reporting to the server.

Figure 4:
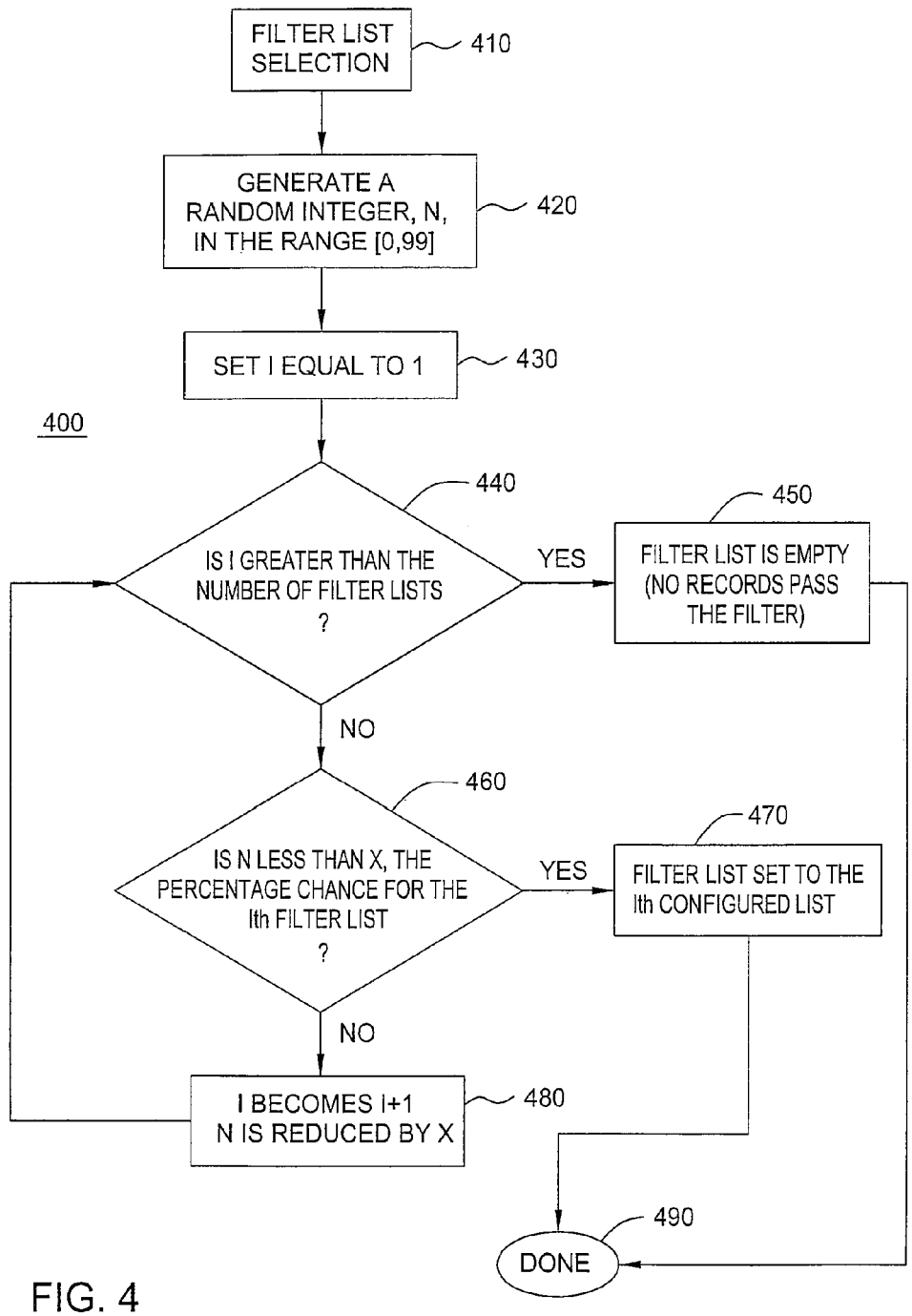
FIG. 4 depicts a high level block diagram of a method for randomly selecting filter lists to be associated with client devices or set top boxes within an information distribution system.

FIG. 4 depicts a high level block diagram of a method for randomly selecting filter lists to be associated with client devices or set top boxes within an information distribution system, such as discussed above with respect to FIG. 1.

The method 400 of FIG. 4 is entered at step 410, when a filter list selection is performed. That is, at step 410 the criteria associated with a statistics filter is determined such that the propagation of filter configuration parameters to a portion of the client base will cause those clients receiving the filter configuration parameters (e.g., via configuration files) to operate in accordance with the selected filter list.

At step 420, a random number N is generated, illustratively in the range of 0 to 99. At step 430, a variable I is set equal to 1 (the variable I may also be set equal to numbers other than 1).

At step 440, a determination is made as to whether the number I is greater than the number of filter lists. If I is greater than the number of filter lists, then at step 450 the filter list is deemed to be empty (i.e., no records pass the filter) and the method is exited at step 490. If I is not greater than the number of filter lists, then at step 460 a determination is made as to whether N is less than a variable X, where X is equal to the percentage chance for the Ith filter list. If the query at step 460 is answered affirmatively, then the filter list is set to the Ith configured list and the method exits at step 490. Otherwise, at step 480 I is incremented by, illustratively 1, while N is reduced by X. After step 480, the method returns to step 440.

Thus, in one embodiment of the invention, each of a plurality of client devices within the user community selects one of a plurality of available filter configuration lists such that a sampling of statistical information associated with the user community may be logged and reported to the server for further processing.

EXAMPLES

Several examples using the embodiments discussed above with respect to FIG. 4 will now be described using the following assumptions:

(1) Each record to be filtered as a 4 character signature (this could be any length, or an integer, or some other value known by both the applications logging the records and the server operator entering the filter lists in the configuration file);

(2) The configuration file entries are all of the standard Java properties format (KEY=VALUE or KEY:VALUE or KEY VALUE are all valid);

(3) The filter.lists.num key is required it can be a value from 0 to 100 and indicates how many different filter lists there are to choose from (henceforth this will be referred to as N);

(4) For all values i in the inclusive range 1 to N there will be the keys filter.lists.i.value and filter.lists.i.percent;

(5) Each value for filter.lists.i.percent must be >0 and the sum of all filter. lists.i.percent values must be <=100;

(6) The value for filter.lists.i.value is of the form SIG|SIG2|SIG3 . . . |SIGx. Where each SIGx is a character signature to be accepted by the filter list;

(7) The special signature value "*" can be used to mean all signatures. If it is present in the list, the other signatures in the value are excluded by the filter rather than included; and (8) If the sum of the filter.lists.i.percent values is <100, the remaining percentage is assigned to an empty filter list (i.e. no records will be accepted).

It should be noted that the range for integral percentages is limiting and not required, and that the filter lists selection could be abstracted to more than just statistics logging (e.g., load balancing, reporting times and the like may also be provided)

Example 1 configuration file contents:
  filter.lists.num=0

Example 2 configuration file contents:
  filter.lists.num=2
  filter.lists.1.value=TVLC
  filter.lists.1.percent=5
  filter.lists2.value=APLN|APDN
  filter.lists2.percent=5
result:
  approximately 5% of clients will only log records with the key TVLC
  approximately 5% of clients will only log records with the keys of APLN or APDN Example 3 configuration file contents:
  filter.lists.num=3
  filter.lists.1.value=TVLC
  filter.lists.1.percent=5
  filter.lists.2.value=|TVLC
  filter.lists2.percent=5
  filter.lists.3.value=*
  filter.lists.3.percent=1
result:
  approximately 5% of clients will only log records with the key TVLC
  approximately 5% of clients will log all records except those with the key of TVLC
  approximately 1% of clients will log all records The subject invention contemplates the applying of common filter criteria to each member of a group of clients within the client community. In various embodiments of the invention, the client community comprises a plurality of client or user groups. The groups optionally overlap such that client devices are members of multiple groups. Such overlap may be driven by, for example, client devices associated with the geographic affinity with one group and a demographic affinity with another group.

Group membership and/or selection of client devices for specific filter criteria is performed according to at least one of the following filter list selection criteria:

(1) Weighted random (such as discussed above with respect to FIG. 4);

(2) Time of day/week (e.g., log on filtered list of statistics in prime-time, another in late-night, and another during weekends);

(3) Specific clients or STBs identified by their unique addresses or neighborhoods;

(4) Location (e.g., geographic region, head-end node and the like);

(5) Service tiers (e.g., log one set of statistics for users with all services, another set for users with basic services, etc.);

(6) Set top box class (e.g., low-end STBs use one filter list, personal video recorder (PVR) STBs use another filter list and the like);

(7) The revision of certain software (e.g., STB OS version, middleware version, EPG version and the like);

(8) Demographic information (e.g., client household, regional or other demographic parameters);

(9) Software requests (e.g., an application or applet requests a change to its current selected filter list); and

(10) Available RDC bandwidth.

Figure 5:
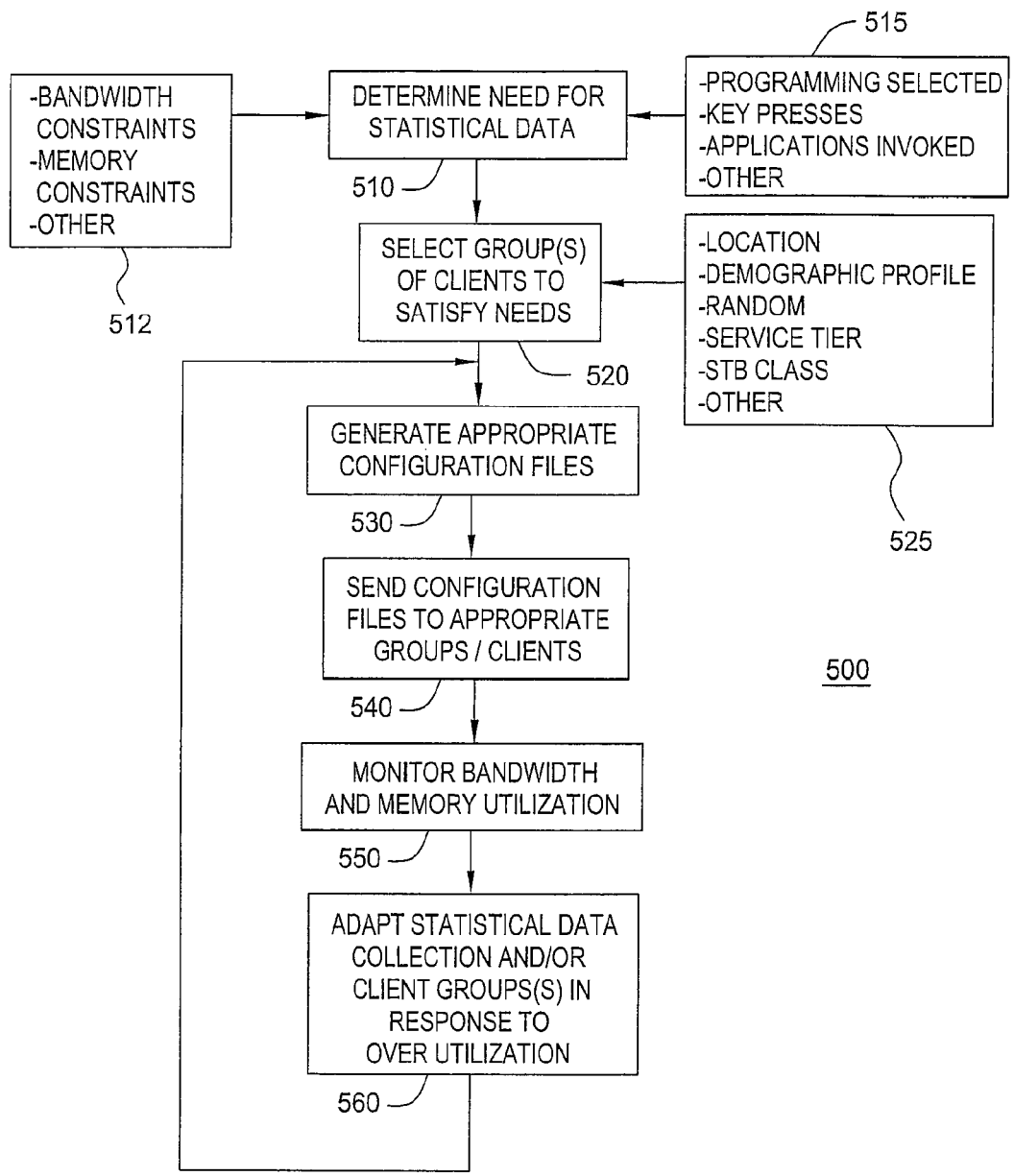
FIG. 5 depicts a high level block diagram of a method for managing the retrieval of statistical information in an information distribution system such as discussed above with respect to FIG. 1.

FIG. 5 depicts a high level block diagram of a method for managing the retrieval of statistical information in an information distribution system such as discussed above with respect to FIG. 1. Specifically, the method 500 of FIG. 5 operates within the context of a network manager or server and is used to identify statistical data gathering needs, propagate configuration files to the client community adapted to satisfy the identified needs and adapt the configuration files and/or statistics gathering client community in response to bandwidth and/or memory constraints of the system.

The method 500 of FIG. 5 is entered at step 510, where the need for statistical data is determined. As discussed above, the statistical data to be gathered may be used to effect application billing, system management and other functions. Referring to box 515, the statistical data gathered may comprise selected programming, key presses, applications invoked, billing triggering events and other types of statistics such as those previously discussed. Referring to box 512, the need for statistical data is balanced by the ability of the system to provide such data. This limitation on ability is primarily attributable to bandwidth constraints (e.g., RDC bandwidth) or memory constrains (e.g., client or server device memory, buffering and the like).

At step 520, the group or groups of clients appropriate to satisfy the statistics data need are selected. Referring to box 525, such group(s) may be populated with members according to client location, demographic profile, random selection (e.g., per FIG. 3), STB service tier, STB class (e.g., thin or thick client device) and/or other criteria.

At step 530, the appropriate configuration files are generated for the client's devices and/or client group(s). At step 540, the configuration files are transmitted to the appropriate client's devices and/or client group(s) via, for example, an in-band (e.g., FATC) or out of band (e.g., forward data channel) communications link. As previously discussed, the configuration files are utilized by the clients to filter criteria which, in turn, defines the types and/or quantities of statistical information reported by the application(s) resident on the client device.

At step 550, the bandwidth and/or memory resource utilization is monitored. At step 560, in response to bandwidth and/or memory resource utilization above a threshold level, the statistics data to be collected and/or the client group(s) or individual clients supplying such data are adapted in a manner tending to reduce utilization of at least one of the resources. The method then returns to step 530, where new configuration files are generated in response to the adapters of step 560. The method continues to cycle through steps 530-560 as necessary.

While not specifically shown, the system manager or server device invoking the method 500 of FIG. 5 is causing the reporting of various statistics from individual clients or client group(s). These statistics are utilized by at least one of the MSO or system operator, application owner, content provider, EPG provider and the like to enhance or market/sell their respective service.

Thus, within the system management context, the server or management function may select a portion of the clients within the client community for statistics reporting. For example, a first portion (e.g., 5%) of the clients is associated with a first filter, a second portion (e.g., 10%) is associated with a second filter, and the like. The filter information may be based on random selection, geographic information, demographic information or other information. The server or management function data base is used to store household/filter mappings such that service providers or other applications may access the reported data. It will be also noted that filter configuration parameters may be sent to all clients within a client community via a broadcast channel, where only those clients associated with a particular ID, a particular geographic location or neighborhood; or some other identification actually accept and process the received filter parameters. Alternatively, point cast or narrow cast channels may be used to specifically target filter parameters to the clients intended to utilize the filter parameters. Thus, using client addressing and/or channel selection, specific filter parameters may be pushed out to those client devices having associated with them demographic information that is compatible with a particular server or advertiser goal.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

In one embodiment of the invention, a single filter configuration parameter file contains the configuration information for all client devices receiving the file, such that the selection of those client devices within the group of client devices receiving the configuration file determine which subset of client devices reports the associated statistics. Alternatively, filter configuration parameters are customized to individual clients, client groups and the like to enable the concurrent filtering of multiple filter parameters within the client device community.

While the foregoing is directed to the preferred embodiment of the present invention, other and further embodiments of the invention may be 15 devised without departing from the basic scope thereof, and the scope thereof is determined by the claims that follow.

What is claimed is:

1. A method, comprising:
    launching an application on a client device for logging reporting data of the client device;
    determining, by the client device, whether a key value associated with the application and reporting data satisfy criteria for sending data via a reverse data channel to a server;
    if the key value satisfies the criteria, then transmitting, by the client device, to the server and via the reverse data channel, the reporting data; and
    if the key value does not satisfy the criteria, then logging, by the client device, the reporting data.

2. The method of claim 1, further comprising including, in the reporting data, statistical or usage data.

3. The method of claim 1, further comprising including, in the reporting data, data related to a video-on-demand service, user navigation, or user requests.

4. The method of claim 1, further comprising:
including, in the criteria, filtering information that indicates one or more types of possible reporting data; and
including, in the reporting data, data of the indicated one or more types of possible reporting data.

5. The method of claim 1, further comprising at least one of:
providing the criteria on the client device; or
transmitting the criteria from the server to the client device.

6. The method of claim 1, further comprising receiving the reporting data in accordance with a reverse data channel utilization level.

7. The method of claim 1, further comprising including the client device in a subset of a plurality of client devices, the subset being selected based on at least one of a client device geographic profile, a client device user demographic profile, or a percentage of client device population.

8. The method of claim 1, further comprising including the client device in a subset of a plurality of client devices, the subset being selected by identifying client devices having compatible demographic information and sampling one or more client devices from those having compatible demographic information.

9. The method of claim 1, further comprising including the client device in a subset of a plurality of client devices, the subset being selected by randomly associating each of the plurality of client devices with one of a plurality of available filter configuration lists.

10. The method of claim 1, further comprising providing the criteria in a file format.

11. A client device comprising:
a processor; and
a memory storing instructions that when executed by the processor cause the client device to:
launch an application on the client device for logging reporting data of the client device;
determine, by the client device, whether a key value associated with the application and reporting data satisfy criteria for sending data via a reverse data channel to a server;
if the key value satisfies the criteria, then transmit, to the server and via the reverse data channel, the reporting data; and
if the key value does not satisfy the criteria, then log, by the client device, the reporting data.

12. The client device of claim 11, wherein the reporting data comprise at least statistical data or usage data.

13. The client device of claim 11, wherein the reporting data comprise data related to at least one of a video-on-demand service, user navigation, or user requests.

14. The client device of claim 11, wherein the criteria comprise filtering information that indicates one or more types of possible reporting data, and the reporting data comprise data of the indicated one or more types of possible reporting data.

15. The client device of claim 11, wherein the criteria are transmitted from the server to the client device or are resident on the client device.

16. The client device of claim 11, wherein the reporting data are received in accordance with a reverse data channel utilization level.

17. The client device of claim 11, wherein the client device is part of a subset of a plurality of client devices, the subset being selected by the server based on at least one of a client device geographic profile, a client device user demographic profile, or a percentage of client device population.

18. The client device of claim 11, wherein the client device is part of a subset of a plurality of client devices, the subset being selected by identifying client devices having compatible demographic information and sampling one or more client devices from those having compatible demographic information.

19. The client device of claim 11, wherein the client device is part of a subset of a plurality of client devices, the subset being selected by randomly associating each of the plurality of client devices with one of a plurality of available filter configuration lists.

20. The client device of claim 11, wherein the criteria are in a file format.

* * * * *